Jan. 31, 1961 F. J. PRINES 2,970,298
BISTABLE CIRCUIT
Filed June 13, 1958
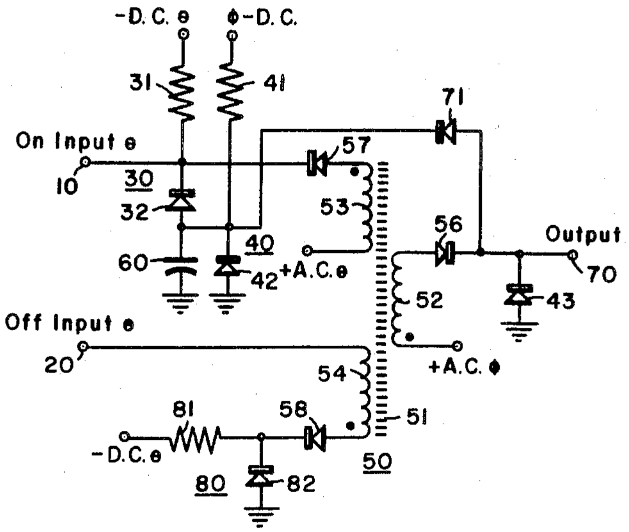
WITNESSES
John E. Healy, Jr.
Myron E. Click
INVENTOR
Frank J. Prines
BY F. E. Browder
ATTORNEY United States Patent Office 2,970,298

Patented Jan. 31, 1961

2,970,298

BISTABLE CIRCUIT

Frank J. Prines, Penn Hills Township, Allegheny County, Pa., assignor to Westinghouse Electric Corporation, East Pittsburgh, Pa., a corporation of Pennsylvania Filed June 13, 1958, Ser. No. 741,765

8 Claims. (Cl. 340—174)

This invention relates to bistable circuits in general and in particular to bistable circuits utilizing a magnetic amplifier.

The advent of a method for utilizing the magnetic amplifier as a high speed logic circuit has led to the acceleration of development of magnetic amplifiers for use as matching logic circuits. The inherent advantages of magnetic amplifiers in ruggedness, reliability and maintenance-free operation makes the use of magnetic amplifiers very desirable in many applications. For example, industrial control makes excellent use of magnetic amplifier advantages because of the millions of operations that machine tools and other related apparatus perform over only a few months time. Control equipment embodying relays and vacuum tubes, for example, tend not to be reliable when subjected to such operation.

Bistable magnetic amplifiers have been developed in the prior art, but require at least two saturable magnetic cores or require related space and cost consuming components to perform the bistable function.

Accordingly, it is an object of this invention to provide an improved magnetic amplifier.

It is another object of this invention to provide a bistable circuit utilizing a magnetic amplifier.

It is still another object of this invention to provide an improved bistable magnetic amplifier which utilizes only one saturable magnetic core.

Further objects of this invention will becomes apparent from the following description when taken in conjunction with the accompanying drawing. In said drawing, for illustrative purposes only, is shown a preferred form of the invention.

In the drawing the manner in which the windings have been wound upon the associated saturable magnetic core has been denoted by the polarity dot convention. That is, current flowing into the polarity dot end of a winding will drive the associated saturable magnetic core toward positive saturation. Current flowing out of the polarity dot end of a winding will drive the associated core away from positive saturation.

Referring to the drawing there is illustrated a schematic diagram of a bistable magnetic amplifier circuit embodying the teachings of this invention. The bistable circuit comprises in general a magnetic amplifier 50 having an ON input terminal 10, an OFF input terminal means 20, and output terminal means 70.

The magnetic amplifier 50 comprises a saturable magnetic core 51 having inductively disposed thereon an output or gate winding 52, a first reset winding 53, and a second reset winding 54. The output winding 52 is connected between a source of alternating current of a first phase, hereinafter designated as the $\phi$ phase, and a rectifier 56 which is connected to the output terminal 70.

The first reset winding 53 is connected in series with a rectifier 57 between a source of alternating current of a second phase, hereinafter called the $\theta$ phase, and the input terminal 10. The second reset winding 54 is connected in series with a rectifier 58 between the input terminal 20 and a non-linear circuit 80. The $\theta$ and $\phi$ phases of alternating voltages are phased substantially 180° apart and are of the same frequency.

A non-linear circuit 30 comprises a resistance 31 and a rectifier 32. The non-linear circuit 30 is connected betwen a pulsating, negative, half-wave direct-current of the $\theta$ phase at one end and through a capacitor 60 to ground at the other end. The energy storage means or capacitor 60 is thus effectively connected across the winding 53. The junction of the resistor 31 and the rectifier 32 is connected to the terminal 10. The output terminal 70 is connected through a rectifier 71 to the junction of the capacitor 60 and the rectifier 32. The non-linear circuit 40 comprises a resistor 41 and a rectifier 42 connected between a negative, pulsating, half-wave direct-current of the $\phi$ phase and ground. The junction of the resistor 41 and the rectifier 42 is connected to the junction of the capacitor 60 and the rectifier 32. The non-linear circuit 80 comprises a resistor 81 and a rectifier 82 connected in series circuit relationship between a negative, pulsating, half-wave direct-current source of the $\theta$ phase and ground. A rectifier 43 is connected between the output terminal 70 and ground.

In operation the alternating-current sources of the $\phi$ and $\theta$ phases connected to supply the output winding and the first reset winding are of sufficient magnitude to drive the saturable magnetic core 51 to positive and negative saturation, respectively. The input signal to be delivered to the OFF input terminal 20 is of sufficient magnitude to drive the saturable magnetic core 51 to negative saturation. The alternating-current sources of the $\theta$ and $\phi$ phases are of the same frequency. On the $\phi$ half-cycle of the alternating-current, current flows through the winding 52, through the rectifier 56 and the rectifier 43 in the reverse direction to ground. Current is allowed to flow in the reverse direction through the rectifier 43 because a slightly larger current flow through the rectifier 43 in the forward direction is caused by the negative direct current of the $\phi$ phase connected to the non-linear circuit 40. The magnitude of the superimposed current flowing through the rectifier 43 in the reverse direction is just sufficient to supply exciting current to the winding 52 to drive the saturable magnetic core 51 from negative to positive saturation. Thus the non-linear circuit 40 operates here to provide a low impedance path for the exciting current requirements of the winding 52. Current flow in the first reset winding 53 during the $\phi$ half-cycle is blocked by the rectifier 57.

On the following or $\theta$ half cycle, current flow in the output winding 52 is blocked by the rectifier 56. Current, however, does flow through the winding 53, through the rectifier 57, the rectifier 32 in the reverse direction and the rectifier 42 in the reverse direction to ground. During this portion of operation the rectifier 42 of the non-linear circuit 40 actually operates as a part of the non-linear circuit 30. Current flow in the reverse direction through the rectifiers 32 and 42 is allowed in the same fashion as current flow in the reverse direction in the rectifier 43. Therefore, the rectifiers 32 and 42 operate as non-linear impedances to provide a low impedance path for the exciting current requirements of the winding 53. During this half cycle, however, the bias current for the non-linear circuit rectifiers 32 and 42 is furnished by the negative, pulsating, half-wave direct current of the $\theta$ phase connected to the non-linear circuit 30. Current flow in the winding 53 during the $\theta$ half-cycle drives the saturable magnetic core member 51 from positive to negative saturation. Thus, assuming no input signals are applied to the terminals 10 and 20, the saturable magnetic core 51 will be cycled between positive and negative saturation, and no output will appear at the terminal 70.

An ON input signal of the θ phase is now applied to the input terminal 10. The ON input at the terminal 10 must be of sufficient magnitude and polarity to block the resetting action in the winding 53 at the rectifier 57. Since the saturable magnetic core 51 will not be reset from positive to negative saturation, then on the next or φ half-cycle an output will appear at the terminal 70, since the current in the winding 52 must no longer be used to drive the saturable magnetic core 51 from negative to positive saturation.

When an output appears at the terminal 70, it is fed back through the rectifier 71 to charge the capacitor 60. Thus, on the θ half cycle when the output disappears from terminal 70, the capacitor 60 is still fully charged and, in discharging, blocks the resetting action of the winding 53 at the rectifier 57. Accordingly, again on the next φ half-cycle an output will again appear at the terminal 70 and again recharge the capacitor 60. Therefore, the circuit illustrated in the drawing will continue to have an output at the terminal 70 on the φ half-cycle, even though the ON input signal is removed from the terminal 10, until an OFF input signal is applied to the OFF terminal 20.

When the OFF input signal of the θ phase is applied to the input terminal 20, current flows through the winding 54, the rectifier 58 and the non-linear circuit 80 to ground, resetting the saturable magnetic core 51 from positive to negative saturation. Current flow in the reverse direction in the rectifier 82 of the non-linear circuit 80 is performed in the some manner as in the non-linear circuits hereinbefore described.

Thus, on the φ half-cycle following the application of a θ OFF input signal, no output will appear at the terminal 70, since current flow in the winding 52 is now again being consumed in driving the saturable magnetic core 51 from negative to positive saturation. Since the output is removed from the terminal 70, the capacitor 60 is no longer being charged from the output voltage. Since the output voltage is not fed back through the rectifier 71 to the capacitor 60, the resistor 41 and rectifier 42 operate as a non-linear circuit in clamping the capacitor 60 to ground, and the capacitor 60 is discharged through the rectifier 42 in the reverse direction in the manner hereinbefore described. The apparatus illustrated in the drawing is now returned to its original OFF state, and with the removal of the OFF input signal to the terminal 20, the OFF state of the bistable circuit is maintained.

The second reset winding 54 and its associated circuitry represents only one of a number of means known to those skilled in the art for resetting the core 51 to negative saturation, thereby removing the output at the terminal 70, and allowing the circuit to return to its original or OFF state if so desired.

In summary, the magnetic amplifier of the present invention comprises a saturable magnetic core having coupled thereto a gating circuit, a first reset circuit and a second reset circuit. Said gating circuit comprises the load winding 52 serially connected with the self-saturating rectifier 56 between an alternating voltage of a first phase and an output terminal means 70. The first reset circuit means comprises the first reset winding 53 serially connected between an alternating voltage of a second phase and an ON input means. Said ON input means comprises the input terminal 10, and non-linear circuits 30 and 40, with the rectifier 42 of the non-linear circuit 40 cooperating with the whole of non-linear circuit 30 to provide a low impedance path for the exciting current in the winding 53 during the reset or θ or said second phase. The non-linear circuit 40 cooperates with the non-linear circuit 30 to clamp the capacitor 60 to ground, that is to provide a discharge path. The capacitor 60 is connected to store energy from the output means 70 and to discharge said stored energy to block the resetting action of the first reset circuit. The second reset circuit comprises the second reset winding 54 connected between means for applying an OFF input signal 20 through a rectifier 58 to the non-linear circuit 80.

In conclusion, it is pointed out that while the illustrated example constitutes a practical embodiment of my invention, I do not limit myself to the exact detail shown, since modification of the same may be varied without departing from the spirit and scope of this invention.

I claim my invention:

1. In a magnetic amplifier, in combination, a saturable magnetic core having coupled thereto a gating circuit, a first reset circuit and a second reset circuit; said gating circuit and said first reset circuit adapted to be connected respectively to separate sources of alternating voltage of the same frequency but substantially 180° out of phase and of sufficient magnitude to cycle said saturable magnetic core between positive and negative saturation; means for applying an ON input signal of sufficient magnitude to said first reset circuit to block the resetting of said core by said first reset circuit; energy storage means connected to store energy from an output from said gating circuit and discharge said stored energy to block said resetting action on said core by said first reset circuit; and means for applying an OFF input signal to said second reset circuit of sufficient magnitude to reset said saturable magnetic core.

2. A magnetic amplifier comprising a load circuit, a reset circuit, and a saturable magnetic core; said load circuit comprising output winding means inductively disposed on said saturable magnetic core and serially connected between means for applying a first source of alternating voltage and first self-saturating rectifier means; said reset circuit comprising reset winding means inductively disposed on said saturable magnetic core and serially connected between means for applying a second source of alternating voltage and second self-saturating rectifier means; said first and second sources of alternating voltage being of the same frequency and phased substantially 180° apart; output means connected to said load circuit; means for applying an input signal to said reset circuit; energy storage means connected across said reset winding means; and means connecting said output means to said energy storage means.

3. A magnetic amplifier comprising a load circuit, a reset circuit, and a saturable magnetic core; said load circuit comprising output winding means inductively disposed on said saturable magnetic core and serially connected between means for applying a first source of alternating voltage and first self-saturating rectifier means; said reset circuit comprising reset winding means inductively disposed on said saturable magnetic core and serially connected between means for applying a second source of alternating voltage and second self-saturating rectifier means; said first and second sources of alternating voltage being of the same frequency and phased substantially 180° apart; input means connected to said reset circuit; output means connected to said load circuit; energy storage means connected across said reset winding means; means connecting said output means to said energy storage means; said input means comprising non-linear circuit means providing a low impedance path for exciting current flow in said reset winding and also providing a discharge path for said energy storage means.

4. A magnetic amplifier comprising a load circuit, a reset circuit, and a saturable magnetic core; said load circuit comprising output winding means inductively disposed on said saturable magnetic core and serially connected between means for applying a first source of alternating voltage and first self-saturating rectifier means; said reset circuit comprising reset winding means inductively disposed on said saturable magnetic core and serially connected between means for applying a second source of alternating voltage and second self-saturating rectifier means; said first and second sources of alternating voltage being of the same frequency and phased substantially 180° apart; input means connected to said reset circuit; output means connected to said load circuit; energy storage means connected across said reset winding means; means connecting said output means to said energy storage means; said input means comprising non-linear circuit means providing a low impedance path for exciting current flow in said reset winding and also providing a discharge path for said energy storage means, said non-linear circuit means comprising serially connected first and second rectifier means, current limiting means and bias supply means; said first rectifier means being connected in parallel with said energy storage means.

5. A magnetic amplifier comprising a load circuit, a reset circuit, and a saturable magnetic core; said load circuit comprising output winding means inductively disposed on said saturable magnetic core and serially connected between means for applying a first source of alternating voltage and first self-saturating rectifier means; said reset circuit comprising reset winding means inductively disposed on said saturable magnetic core and serially connected between means for applying a second source of alternating voltage and second self-saturating rectifier means; said first and second sources of alternating voltage being of the same frequency and phased substantially 180° apart; input means connected to said reset circuit; output means connected to said load circuit; energy storage means connected across said reset winding means; means connecting said output means to said energy storage means; said input means comprising non-linear circuit means providing a low impedance path for exciting current flow in said reset winding and also providing a discharge path for said energy storage means, said non-linear circuit means comprising serially connected first and second rectifier means, current limiting means and bias supply means; said first rectifier means being connected in parallel with said energy storage means; said second rectifier means being connected in series with said energy storage means across said reset winding means.

6. A magnetic amplifier comprising a load circuit, a reset circuit and a saturable magnetic core; said load circuit comprising output winding means inductively disposed on said saturable magnetic core and serially connected between means for applying a first source of alternating voltage and first self-saturating rectifier means; said reset circuit comprising reset winding means inductively disposed on said saturable magnetic core and serially connected between means for applying a second source of alternating voltage and second self-saturating rectifier means, said first and second sources of alternating voltage being of the same frequency and phase substantially 180° apart; input means connected to said reset circuit; output means connected to said load circuit; energy storage means connected across said reset winding means; means connecting said output means through isolating rectifier means to said energy storage means; said input means comprising non-linear circuit means providing a low impedance path for exciting current flow in said reset winding and also providing a discharge path for said energy storage means, said non-linear circuit means comprising serially connected first and second rectifier means, current limiting means and bias supply means; said first rectifier means being connected in parallel with said energy storage means; said second rectifier means being connected in series with said energy storage means across said reset winding means.

7. A magnetic amplifier comprising a load circuit, a reset circuit and a saturable magnetic core; said load circuit comprising output winding means inductively disposed on said saturable magnetic core and serially connected between means for applying a first source of alternating voltage and first self-saturating rectifier means; said reset circuit comprising reset winding means inductively disposed on said saturable magnetic core and serially connected between means for applying a second source of alternating voltage and second self-saturating rectifier means, said first and second sources of alternating voltage being of the same frequency and phase substantially 180° apart; input means connected to said reset circuit; output means connected to said load circuit; energy storage means connected across said reset winding means; means connecting said output means through isolating rectifier means to said energy storage means; said input means comprising non-linear circuit means providing a low impedance path for exciting current flow in said reset winding and also providing a discharge path for said energy storage means, said non-linear circuit means comprising serially connected first and second rectifier means, current limiting means and a pulsating direct-current bias supply means of said second source; said first rectifier means being connected in parallel with said energy storage means; said second rectifier means being connected in series with said energy storage means across said reset winding means.

8. A magnetic amplifier comprising a load circuit, a reset circuit and a saturable magnetic core; said load circuit comprising output winding means inductively disposed on said saturable magnetic core and serially connected between means for applying a first source of alternating voltage and first self-saturating rectifier means; said reset circuit comprising reset winding means inductively disposed on said saturable magnetic core and serially connected between means for applying a second source of alternating voltage and second self-saturating rectifier means, said first and second sources of alternating voltage being of the same frequency and phase substantially 180° apart; input means connected to said reset circuit; output means connected to said load circuit; energy storage means connected across said reset winding means; means connecting said output means through isolating rectifier means to said energy storage means; said input means comprising non-linear circuit means providing a low impedance path for exciting current flow in said reset winding and also providing a discharge path for said energy storage means, said non-linear circuit means comprising serially connected first and second rectifier means, current limiting means and a pulsating direct-current bias supply means of said second source; said first rectifier means being connected in parallel with said energy storage means; said second rectifier means being connected in series with said energy storage means across said reset winding means; said first rectifier means being connected to a pulsating, direct-current bias supply means of said first source.

References Cited in the file of this patent

UNITED STATES PATENTS

| | | |
|---|---|---|
| 2,713,674 | Schmitt | July 19, 1955 |
| 2,713,675 | Schmitt | July 19, 1955 |
| 2,792,506 | Torrey | May 14, 1957 |
| 2,825,820 | Sims | Mar. 4, 1958 |
| 2,876,435 | Anderson | Mar. 3, 1959 |